A. E. WHITING.
REVOLVING LAWN RAKE.
APPLICATION FILED DEC. 30, 1913. RENEWED APR. 7, 1916.
1,204,220.
Patented Nov. 7, 1916.
2 SHEETS—SHEET 1.
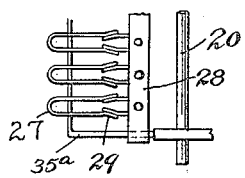
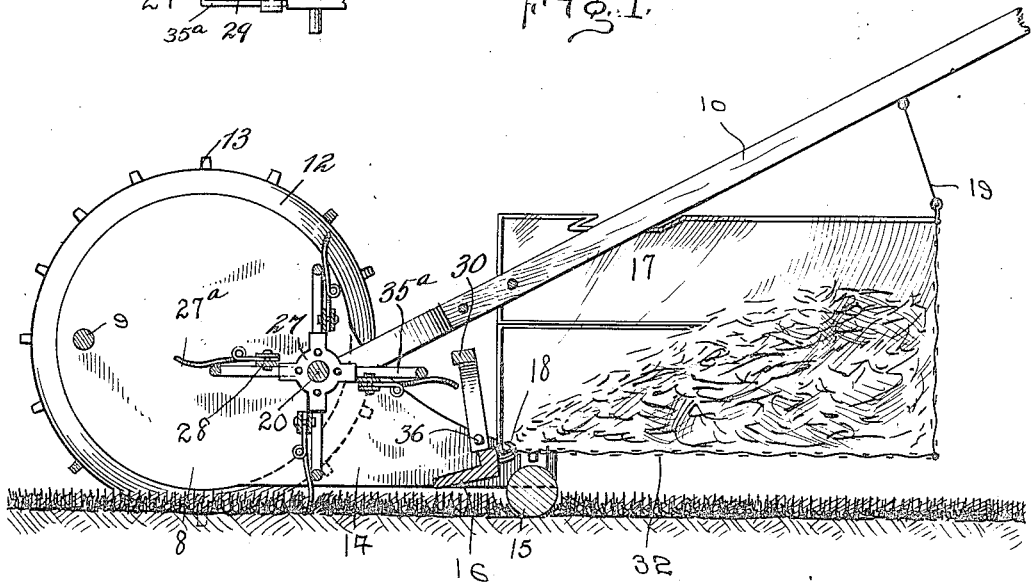
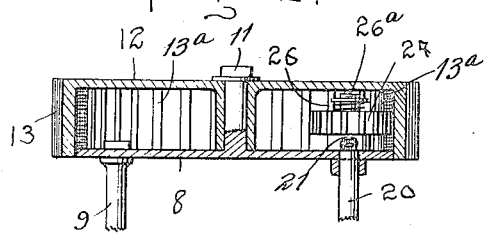
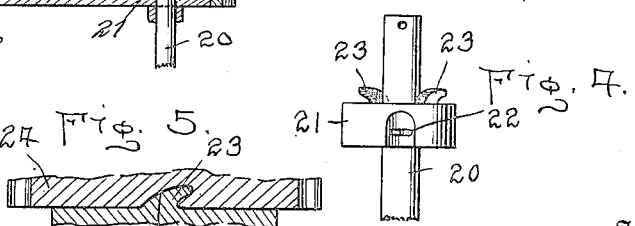
Witnesses
Inventor
A. E. Whiting
By W. J. Fitz Gerald
Attorney

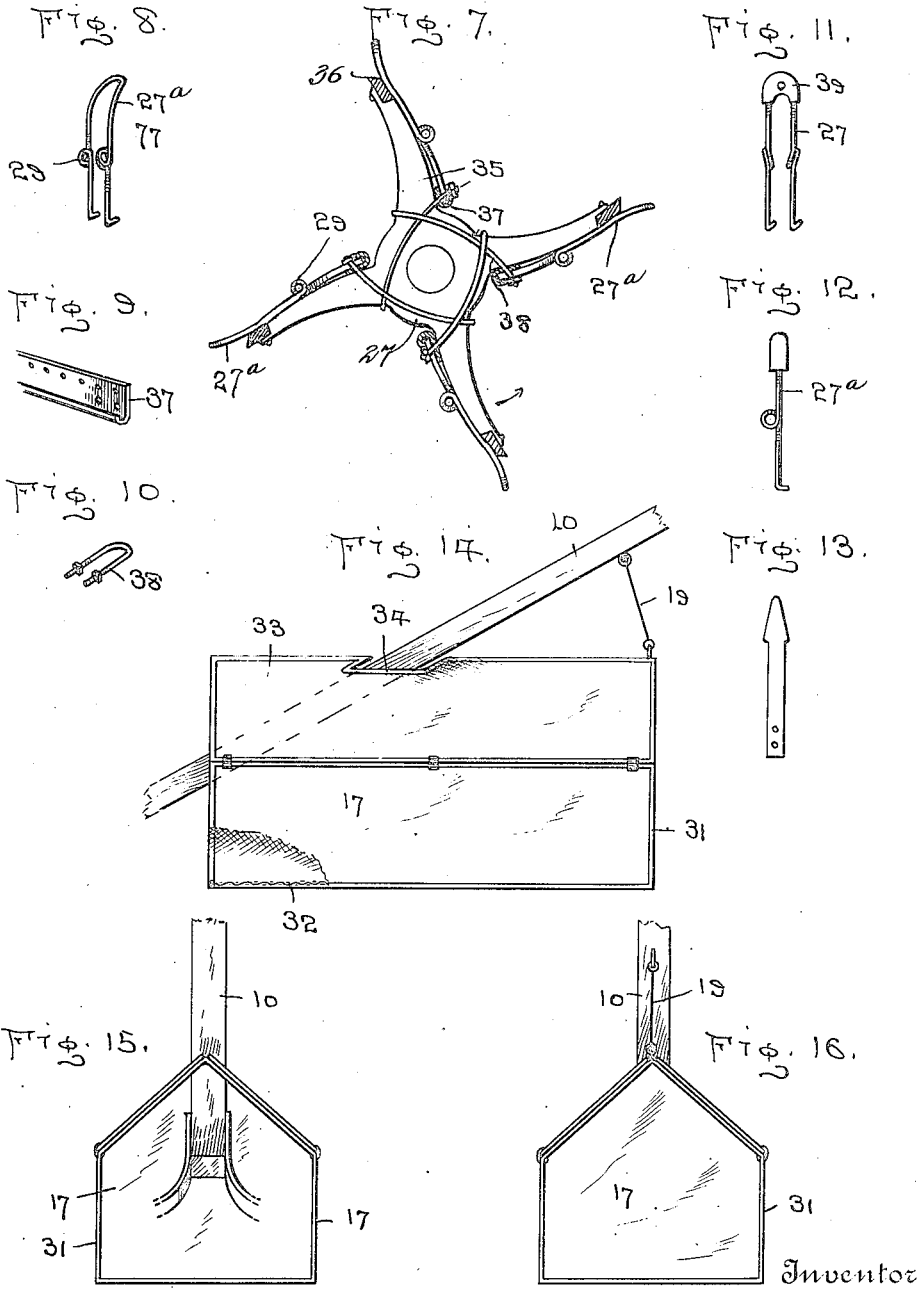

UNITED STATES PATENT OFFICE.

ARTHUR E. WHITING, OF LOUISVILLE, KENTUCKY.

REVOLVING LAWN-RAKE.

1,204,220.　　　　Specification of Letters Patent.　　Patented Nov. 7, 1916.

Application filed December 30, 1913. Serial No. 809,529.　Renewed April 7, 1916.　Serial No. 89,727.

*To all whom it may concern:*

Be it known that I, ARTHUR EDWIN WHITING, a citizen of the United States, residing at Louisville, in the county of Jefferson and State of Kentucky, have invented new and useful Improvements in Revolving Lawn-Rakes; and I do hereby declare the following to be a full, clear, and exact description of the invention, such as will enable others skilled in the art to which it appertains to make and use the same.

The object of this invention is to provide a revolving lawn rake, operable similarly to the ordinary lawn mower, for quickly and conveniently removing refuse from the lawn.

A further object is to provide a rake with spring teeth and means for cleaning the teeth during each revolution.

In the accompanying drawings, wherein is shown a practical and approved embodiment of the invention, Figure 1 represents a vertical sectional view through the lawn rake, as applied to use, Fig. 2 represents a sectional view through one of the wheels of the rake showing in detail the arrangement of the driving mechanism for the rake, Fig. 3 represents a side elevation of the gear wheel comprising a part of the ratchet, Fig. 4 represents a fragmental plan view of the drive shaft and the other part of the ratchet, Fig. 5 represents a fragmental sectional view of the parts of the ratchet locked together, Fig. 6 represents a detail view of the rake teeth and a portion of the supporting arm, Fig. 7 represents a sectional view through a rotary cutter head, showing the application of my improved rake teeth thereto, Fig. 8 represents a perspective view of one of the teeth removed, Fig. 9 represents a modified form of securing bar for the rake teeth, Fig. 10 represents a perspective view of a yoke bolt for securing the teeth and supporting bar in position, Fig. 11 represents a front elevation of a slightly modified form of rake teeth, Fig. 12 represents a side elevation thereof, Fig. 13 represents a further modification of the rake teeth, Fig. 14 represents a fragmental view in side elevation of the handle and grass receptacle supported thereby, Fig. 15 represents a front elevation of the receptacle, and, Fig. 16 represents a rear elevation thereof.

Referring to the drawings in detail, numeral 8 indicates one of a pair of disks fixed together by a connecting rod 9 at their forward portions, and connected at their rear portions by a suitable handle 10, by means of which the rake is adapted to be operated. Each disk is provided with an outwardly extending stub shaft 11 over which is rotatably mounted a wheel 12 having suitable peripheral teeth 13. Each disk 8 is further provided with a rearwardly extending arm 14 and the rear ends of these arms are connected by a bar 16 and a roller 15 which latter assists in supporting the rake in operative position.

A receptacle 17 is secured over hooks 18 at its lower end and supported over the handle 10 by a connection 19.

A shaft 20 is rotatably mounted through the disks 8 and carries ratchet members 21 adjacent its ends. The members 21 are fixed to the shaft by cotter pins 22 and carry a plurality of teeth 23 formed integrally therewith. A pair of gear wheels 24 are rotatably mounted on the ends of the shaft 20 outwardly of the members 21 and are in permanent mesh with the teeth 13ª on the interior of the wheels 12. The wheels 24 are slidable longitudinally of the shaft 20 and are provided with notches 25 adapted to receive the teeth 23 when the rake is moved forwardly for locking the wheels 24 with the shaft 20 through the ratchet member 21. The gears 24 are normally held in engagement with the members 21 by spiral springs 26 disposed around the shaft between the extreme ends thereof and the gears and held in operative position by a washer 26ª and a cotter pin through the shaft. A rake head 27 is fixed to the shaft 20 near to each of the outer faces of the said disks 8, the said rake-heads are provided with a plurality of U-shaped arms 35ª connecting the said heads adapted to provide supports and means of alinement for the medial portions of the teeth 27ª. The said heads are also connected by the bars 28 which are designed to secure the inner ends of the teeth which are preferably clamped between bars 28 in such a manner that they may be easily removed when necessary. The teeth are preferably formed of resilient wire and are formed at their medial portions with coils 29 adapted to increase their resiliency.

An inverted U-shaped cleaner bar 30 is secured between the arms 14 and is pivotally adjusted on the bolt 36 to be struck by the teeth during their rotation for removing anything which may have adhered thereto.

The receptacle 17 consists of a frame 31 preferably formed of durable wire covered upon the sides and rear with canvas, or a similar fabric of light weight, and having an open front end. The bottom 32 of the receptacle is preferably formed of wire mesh so as not to hold the smaller particles deposited in the receptacle during the operation of the machine. Cover sections 33 are hinged to the upper edges of the side walls of the receptacle and are suitably offset at 34 to accommodate the handle 10, when the cover sections are closed.

Referring to Fig. 7, the numeral 27 indicates the rotary cutter head of an ordinary lawn mower having the cutter blades 36. In converting a rotary lawn mower into a revolving lawn rake, I first remove the stationary blade which coöperates with the blades 36 of the cutter head. I then secure angle bars 37 to the arms 35 of the cutter head 27 by suitable yoke bolts 38. It will be understood that angle bars 37 are provided corresponding to the number of arms of the rotary cutter head 27 and each angle bar carries a plurality of the teeth 27$^a$. The free ends of the teeth are preferably arranged behind the cutter blades 36, with respect to the direction of travel of the latter.

Referring to Figs. 11 and 12, the rake teeth 27 are provided at their free ends with shoes 39 adapted to protect that portion of the tooth and to increase the life thereof.

In Fig. 13 there is shown a third form of tooth formed of flat material and having less resiliency than the teeth hereinbefore described.

What I claim is:

In combination with a wheel mounted frame, a rotatively mounted shaft having fixedly mounted rake heads bearing a plurality of tooth supporting arms and tooth securing bars on said arms; a ratchet gear connecting said shaft with the master-wheel; a plurality of resilient rake teeth having coils in their medial portions, said teeth being removably secured to said securing bars and bearing against the supporting arms, a vertically positioned cleaner-bar attached to said frame in the path of said teeth and a receptacle to receive the refuse swept up by the rakes.

In testimony whereof I have signed my name to this specification in the presence of two witnesses.

ARTHUR E. WHITING.

Witnesses:
HENRY PASLICK,
JAMES R. PARR.